United States Patent
Andrews et al.

(10) Patent No.: US 7,536,606 B2
(45) Date of Patent: May 19, 2009

(54) ERROR DETECTION IN WEB SERVICES SYSTEMS

(75) Inventors: Anthony Dean Andrews, Sammamish, WA (US); Sriram K. Rajamani, Bellevue, WA (US); Jakob Rehob, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 10/835,838

(22) Filed: Apr. 30, 2004

(65) Prior Publication Data

US 2005/0257098 A1     Nov. 17, 2005

(51) Int. Cl.
*G06F 11/00* (2006.01)
(52) U.S. Cl. ............................................. 714/43; 714/4
(58) Field of Classification Search ..................... 714/4, 714/43
See application file for complete search history.

(56) References Cited

U.S. PATENT DOCUMENTS

| | | | | |
|---|---|---|---|---|
| 6,332,163 | B1 * | 12/2001 | Bowman-Amuah | 709/231 |
| 2004/0103396 | A1 * | 5/2004 | Nehab | 717/127 |
| 2004/0193703 | A1 * | 9/2004 | Loewy et al. | 709/220 |
| 2004/0254945 | A1 * | 12/2004 | Schmidt et al. | 707/100 |
| 2005/0086297 | A1 * | 4/2005 | Hinks | 709/203 |

OTHER PUBLICATIONS http://xml.coverpages.org/BPELv11-May052003Final.pdf?cf0A70 660C=1E9E72ADC!VVNQVE9cYmFzc2Vzc29yOm50bG061BE GX0G/p3i4ovdXqloa4w==.*
Business Process Execution Language for Web Services version 1.1.
Business Process Execution Language for Web Services, Version 1.0.

* cited by examiner

*Primary Examiner*—Scott T Baderman
*Assistant Examiner*—Paul F Contino
(74) *Attorney, Agent, or Firm*—Merchant & Gould P.C.; Alton Hornsby, III

(57) ABSTRACT

Methods and systems are provided for automatically generating an accurate model of communications processes between disparate computing systems that may be analyzed in an efficient manner for error detection in web services systems. Business Process Execution Language for Web Services (BPEL) descriptions are automatically generated for the BPEL-based executable processes utilized by each communicating computing system in a given web services system. The BPEL abstract process descriptions for each communicating computing system are translated into a combined process model according to a suitable modeling language. The process model is tested by a model checking software application. Communications errors between the disparate computing systems are detected by automatically testing the combined process model according to a variety of potential communications scenarios.

16 Claims, 3 Drawing Sheets

ERROR DETECTION IN WEB SERVICES SYSTEMS

FIELD OF THE INVENTION

The present invention generally relates to error detection in web services systems. More particularly, the present invention relates to modeling of communications between disparate computing systems for communications error detection.

BACKGROUND OF THE INVENTION

With the advent of distributed computing systems, users have become accustomed to communicating and performing a variety of business, education and leisure transactions through a network of Internet-based web services systems. Often, communication errors occur between components of such systems that cause a failure of the desired transactions. In a typical web services system, one web services computing system sends one or more messages to a second web services computing system expecting responsive messages according to particular message protocols and according to particular timing schemes. The second web services computing system expects messages of a particular messaging protocol from the first system, and the second system is designed to respond to the first system according to defined messaging protocols and timing schemes.

In a simple and synchronized system of communication, very exact messaging protocols and messaging send/response timing schemes may be constructed so that very few communications errors occur. However, in a typical setting, communications between disparate web services computing systems are asynchronous where a given web services computing system may be designed to communicate with a number of other web services computing systems and where the timing of message receipt and response between systems may be subject to significant variation.

A number of typical web services communications errors between disparate web services computing systems are often encountered. A first error known as "deadlock" occurs when a process is blocked because a receiving computing system holds processing while waiting for a message that is never sent from a sending computing system. Another error often occurs when a computing system receives a message at an unexpected time and fails to process the message as if the message was never actually received by the computing system. Another type of error often occurs due to timing violations where, for example, a computing system sends a message in an incorrect ordering sequence. Another type of communications error often occurs when a computing system fails to handle a "time out" situation correctly where, for example, the system fails to perform a required function or send a required responsive message within a specified transmission or response time. Other communications errors occur when communications transport systems fail.

For example, a user may electronically communicate from a first web services computing system with a seller of goods. The seller web services computing system may, in turn, communicate with the web services computing system of a shipper of ordered/sold goods. If the user (buyer in this case) decides to cancel a purchased transaction, but the user's cancellation message to the seller is received by the seller web services computing system at an unexpected time, the seller web services computing system may fail to acknowledge the cancellation message, and thus the transaction may fail altogether, or an undesirable result may be produced.

Prior methods for testing the communications interactions between disparate computing systems include running exhaustive manual testing along many recognizable communications paths and sequences to attempt to encounter all possible errors. Unfortunately, such testing schemes are very time consuming and typically fail to discover many potential errors. According to other prior error detection systems, a model of the specification of a computing system executable process is prepared for each communicating system. A combined model is then prepared and checked against a model checking software application in an effort to discover errors that may occur when the disparate computing systems communicate. Unfortunately, such error testing systems are not accurate because such models are prepared from specifications of the individual computing system executable processes independent of the actual implementations of those executable processes. Typically, the implementation-level executable processes may be quite different from a manually produced specification (abstract) of each of the executable processes, particularly where the implementation-level executable processes tend to evolve over time as the processes are updated or otherwise modified. Moreover, preparation of such process models is time consuming and costly. Other prior systems have attempted to automatically generate models from executable processes so that the models may be used for model checking for potential communications errors. Unfortunately, such systems encounter great difficulty in automatically generating models from complex computing languages (e.g., C, C++) suitable for model checking for communications errors.

Accordingly, there is a need for improved methods and systems for error detection in web services systems. It is with respect to these and other considerations that the present invention has been made.

SUMMARY OF THE INVENTION

Embodiments of the present invention solve the above and other problems by providing methods and systems for automatically generating an accurate model of implementation-level communications processes between disparate computing systems that may be analyzed in an efficient manner for error detection in web services systems.

More particularly, according to aspects of the present invention, in distributed computing web services systems, Business Process Execution Language for Web Services (BPEL4WS—hereafter BPEL) abstract process descriptions are generated for the executable implementation-level processes utilized by each communicating computing system in a given web services system (e.g., a buyer system, a seller system and a shipper system). If required, generation of the BPEL abstract process descriptions for each of the web services computing systems may include use of opaque assignments in the place of computational functions found in one or more of the individual executable processes where model checking of those computational functions is not necessary for model checking communications interactions between the disparate computing systems.

The BPEL abstract processes for each communicating computing system are translated into a combined process model according to a suitable modeling language. The combined process model or description is run through a model checking software application where communications errors between the disparate computing systems are detected by automatically testing the combined model according to a variety of potential communications scenarios. According to aspects of the invention, testing of potential communications scenarios includes testing the formats of messages sent and received by disparate computing systems; testing of message send/receive timing and ordering sequencing between the disparate computing systems; and testing of the effects of communications transport failures between the disparate computing systems.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to improved methods and systems for error detection in web services systems. Methods and systems are provided for automatically generating an accurate model of an implementation-level communications process between disparate computing systems that may be analyzed in an efficient manner for communications processes error detection in web services systems.

In the following detailed description, references are made to the accompanying drawings that form a part hereof and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
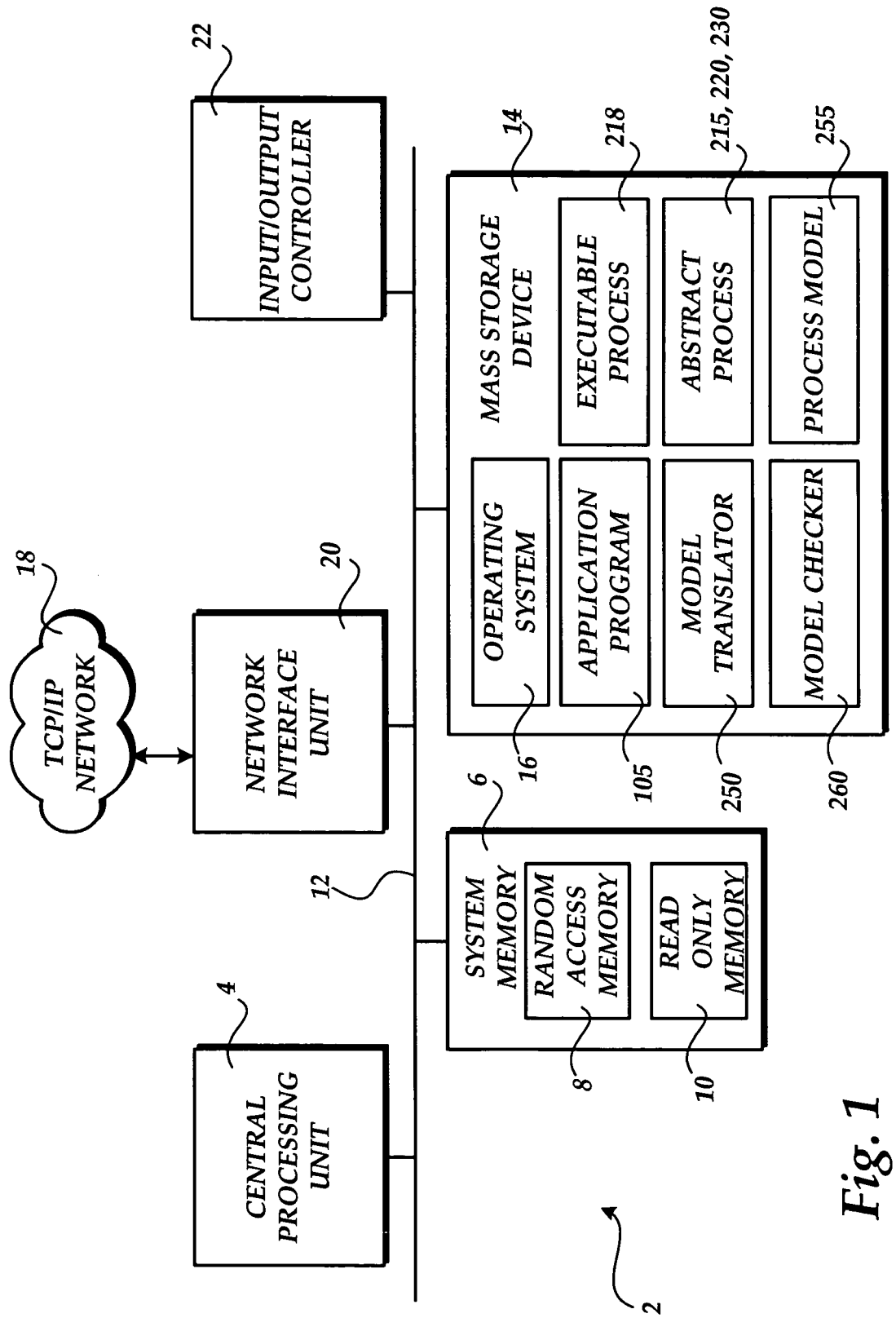
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. As should be appreciated, program modules, including computer-executable instructions, for implementing the functionality of the present invention may be stored and distributed according to a variety of computer-readable media including, compact disks, floppy disks, integrated memory storage devices and the like. Likewise the program modules for implementing the functionality of the present invention may be distributed from one computing system to another computing system via distributed computing environments, such as the Internet and intranets.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105. The application program 105 may comprise a word processing application program, a spreadsheet application, a contact application, and the like. Other applications illustrated in FIG. 1 and applicable to embodiments of the present invention include the model translator application 250, the model checker application 260, and the executable process 218. As described below, abstract processes 215, 220, 230 are automatically generated from executable processes 218. A combined process model 255 is generated from the abstract process for model checking by the model checker application 260.

Figure 2:
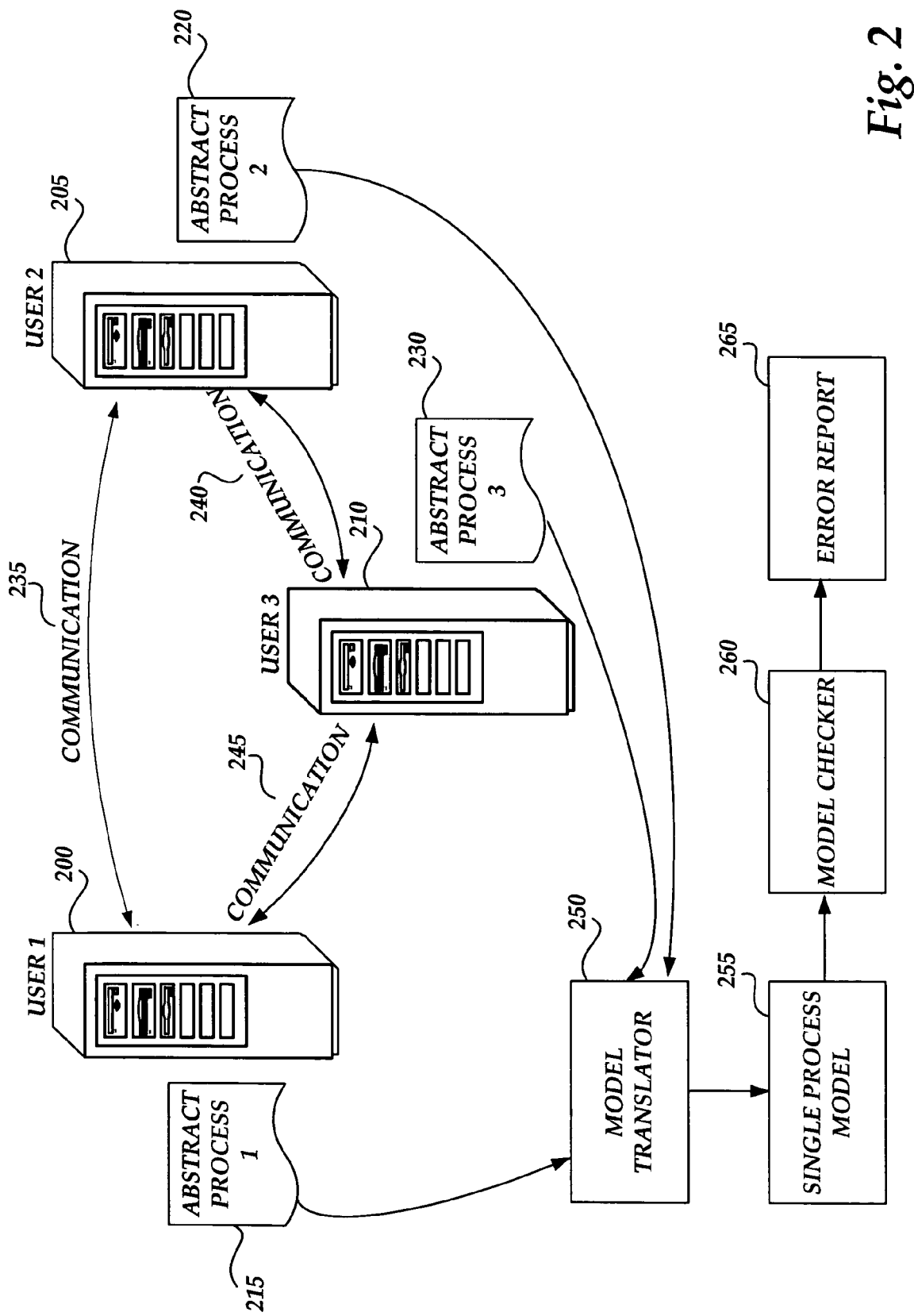
FIG. 2 is a simplified block diagram illustrating components of a distributed web services computing system and illustrating components of an error detection system for web services systems according to embodiments of the present invention.

FIG. 2 is a simplified block diagram illustrating components of a distributed web services computing system and illustrating components of an error detection system for web services systems according to embodiments of the present invention. The web services system illustrated in FIG. 2 includes a first web service (computing system) 200, a second web service (computing system) 205 and a third web service (computing system) 210. As should be appreciated, a web services system such as illustrated in FIG. 2 may be comprised of a much greater number of individual web services and associated computing systems for communicating with each other. For example, as briefly mentioned above, the first web service 200 may comprise a first user operating as a buying system, the second web service 205 may comprise a second user operating as a selling system, and the third web service 210 may comprise a third user operating as a shipping system. For purposes of illustration, this example web services system will be used throughout this document to describe the functionality of the present invention.

As is well known to those skilled in the art, disparate computing systems of the individual web services illustrated in FIG. 2 communicate with each other through a variety of different communications protocols and messaging timing schemes. For example, the system 200 may communicate through a communication protocol 235 with the system 205. The system 205 may communicate with the system 210 through a different communication protocol 240, and the system 200 may communicate with the system 210 through yet a different communication protocol 245. Each of the individual computing systems 200, 205, 210 operated by different users/components of an overall web services system include individual executable processes created by the owners/operators of the individual computing systems for sending and receiving messages to and from other computing systems and for processing data associated with messages sent and received to and from other systems.

Following from the example described above, a buyer system may include an executable process for sending purchase order requests to a selling system and for generating payment orders upon receipt of purchase confirmation and delivery information from a selling system. On the other hand, a selling system may include an executable process for receiving purchase order requests from a buying system and for responsively coordinating shipping orders with a shipping system before returning a sales confirmation, including shipping data and pricing data, to the buying system. As should be appreciated by those skilled in the art, asynchronous communication between such disparate computing systems operating in a web services system is subject to potential communications errors, such as those communications errors described in the background section above. For example, if an executable process operated on the computing system 205 (e.g. selling system) is designed such that only two hours is allowed for a buying system to respond to a purchase order price quote, an error may occur when a responsive message is received by the selling system in a timing and ordering sequence not expected by the selling system. For example, if the selling system is designed to expect price quote acceptances first during a specified time limit followed by shipping date requests from the buying system, but the buying system sends a shipping date request message first followed by an acceptance of price quote to the selling system, the selling system's executable process may become confused by the "out of order" messages from the buying system, and the transaction between the two computing systems may fail.

According to embodiments of the present invention, a Business Process Execution Language for Web Services (BPEL4WS—hereafter BPEL) executable process (implementation-level process) is prepared for each of the communicating computing systems in a given web services system such as is illustrated in FIG. 2. Operation of the BPEL language is well known to those skilled in the art and is described in further detail below. A BPEL abstract process is automatically generated from the implementation-level executable process for each communicating system in the web services system to be checked for communications errors. According to embodiments of the present invention, the implementation-level executable process for a given computing system may include the most recent implementation of the executable process, or the implementation-level executable process may be any implementation of the executable process for which communications error detection is desired for testing interaction between that tested implementation of the executable process with other executable processes of other communicating computing systems. As described below, the abstract processes for the executable processes of each of the communicating systems serve as a simplified descriptive construct for each of the associated executable processes that lend themselves to more efficient model checking according to embodiments of the present invention.

Referring still to FIG. 2, according to embodiments of the present invention, the abstract processes 215, 220, 230 for each of the disparate computing systems in the web services system at issue are passed through a model translator 250 for generating a single process model 255 according to a suitable model checking language. According to embodiments of the present invention, the model translator 255 is a software application containing sufficient computer-executable instructions for combining each of the subject abstract processes into a single process model that may be checked by model checking applications for communications errors encountered by communications interaction between the disparate computing systems. According to embodiments of the present invention, a suitable modeling language into which the abstract processes may be translated includes the PROMELA language, developed by AT&T and the ZING modeling language, developed by Microsoft Corporation of Redmond, Wash. As should be appreciated, a number of suitable modeling languages may be utilized for translating the abstract processes for the disparate computing systems into a single modeling language model, as described herein.

The model checking application 260 is a software application containing sufficient computer-executable instructions for operating the single process model 255 according to a number of operational scenarios for determining communications errors that occur during a given communications scenario. As should be appreciated by those skilled in the art, a number of suitable model checking applications are available for use in accordance with embodiments of the present invention. Example model checking applications include SPIN developed by AT&T and ZING developed by Microsoft Corporation. For example, following from the example web services system described above, the model checking application 260 may process a scenario by which a first computing system (buying system) sends a shipment date request message to a second computing system (selling system) prior to sending a price quote acceptance message to the second system, but where the second system's executable process expects to receive those messages in the opposite order. By operating the process model according to this example scenario, the model checking application 260 may determine whether such a messaging ordering will cause a failure in the communication process between the two systems.

In addition to message ordering and timing testing, the model checking application 260 may be programmed to test communications transport failures. For example, the model checking application 260 may set a test parameter whereby a physical communication link between two communicating computing systems fails at a time when one system is expecting a message from the other system to determine the effects of such failures. Once the model checking application 260 completes checking all potential error scenarios between the disparate computing systems of the tested web services system, an error report 265 may be generated showing all communications errors detected by the model checking application 260.

As described above, according to embodiments of the present invention, the executable processes and abstracts of those processes utilized for generating a model for testing a given web services system are described using the BPEL language. As is known to those skilled in the art, the BPEL language is an executable language for specifying processes and interaction protocols. Such processes include communications in distributed computing systems including electronic mail services, web services, distributed business transactions, and the like, typically consisting of concurrent components interacting via messages passing over the Internet. The BPEL language provides a structured way for specifying and programming the interactions between such components via message passing. The BPEL language is integrated with the web services description language (WSDL), and the BPEL language is typically defined in Extensible Markup Language (XML) format. Typically, BPEL specifications and programs are authored using tools that generate in XML formats.

A BPEL-based executable process performs similar to a scripting language. Instead of describing the behavior of the particular implementation details of an executable process, the BPEL-based executable process describes the manner in which the executable process operates for implementing a web services system. For example, a BPEL-based executable process may specify that a first computing system will accept messages from a second computing system, but that the BPEL-based executable process of the first system may communicate with other computing systems for information or functionality separate from the second computing system.

According to embodiments of the present invention, executable processes written according to WSDL specifications may be wrapped in a BPEL structured format. A WSDL specification for the executable processes is utilized for describing the types and interaction of messages that are sent and that are expected for receipt by a given executable process. The BPEL language wrapper allows for describing the messaging sequencing and timing associated with messages to be sent to and expected messages to be received from a given executable process. For example, a BPEL language formatted executable process may specify that if a first computing system receives a message of type A, responsive messages of type B or type C are acceptable return messages. The BPEL structured executable process of a second computing system may stipulate that the second system is willing to wait on a specified timing basis (e.g., five minutes) for messages of type A and that it will respond with messages of type B or type C and that messages of type B will be sent prior to messages of type C. The BPEL language structuring of executable processes described herein also provides for other control constructs to allow looping and conditional execution. For example, the BPEL language constructs for a given executable process may stipulate that the process is willing to accept a given number of kinds of responsive messages depending upon the type message originally sent by the executable process.

One problem associated with non-BPEL language executable processes, according to embodiments of the present invention, relates to non-deterministic functions embodied in the executable processes. For example, an executable process utilized by a first computing system 200 may include a computational function for calculating data in response to a return message received from a second computing system 205. Because it may not be necessary for the executable process of the second computing system to understand the computational function utilized by the executable process of the first computing system, inclusion of the computational function in a process model for testing communications between the two systems cause preparation of a suitable process model difficult and inefficient. According to the BPEL language, a BPEL-based abstract process may be generated for the executable process, and an opaque assignment may be assigned to the computational function of the first computing system's executable process. The functionality associated with the computational function is not carried over to the process model (abstract). Thus, the abstract process is generated in a more simple fashion and is more easily generated or extracted from the executable process even after the executable process has evolved based due to updates or amendments.

As described above, the second use for the BPEL language, according to embodiments of the present invention, is for automatically generating BPEL-based abstract processes 215, 220, 230. The BPEL-based abstract processes are not executable and are only descriptive of an associated BPEL-based executable process. The BPEL-based abstract processes provide other computing systems with a description of the communications processes performed and expected by a given computing system. The BPEL-based abstract processes are more readily generated from corresponding BPEL-based executable processes through the use of opaque assignments whereby computational functionality and other executable code described in the BPEL-based executable processes are not described in the associated abstract processes where a description of that information is not necessary for providing communications information to other computing systems for communicating with the first computing system.

As should be appreciated, model checking against the process model derived from translating the BPEL-based abstract process also serves as a determination of the conformance of the individual BPEL-based abstract processes with their associated BPEL-based executable processes. That is, if a particular communications error found by the model checking application 260 is determined to be caused by a lack of conformance between a particular BPEL-based abstract process and its associated BPEL-based executable process, it may be determined by a developer of the executable process that changes to the BPEL-based executable process are not necessary.

Figure 3:
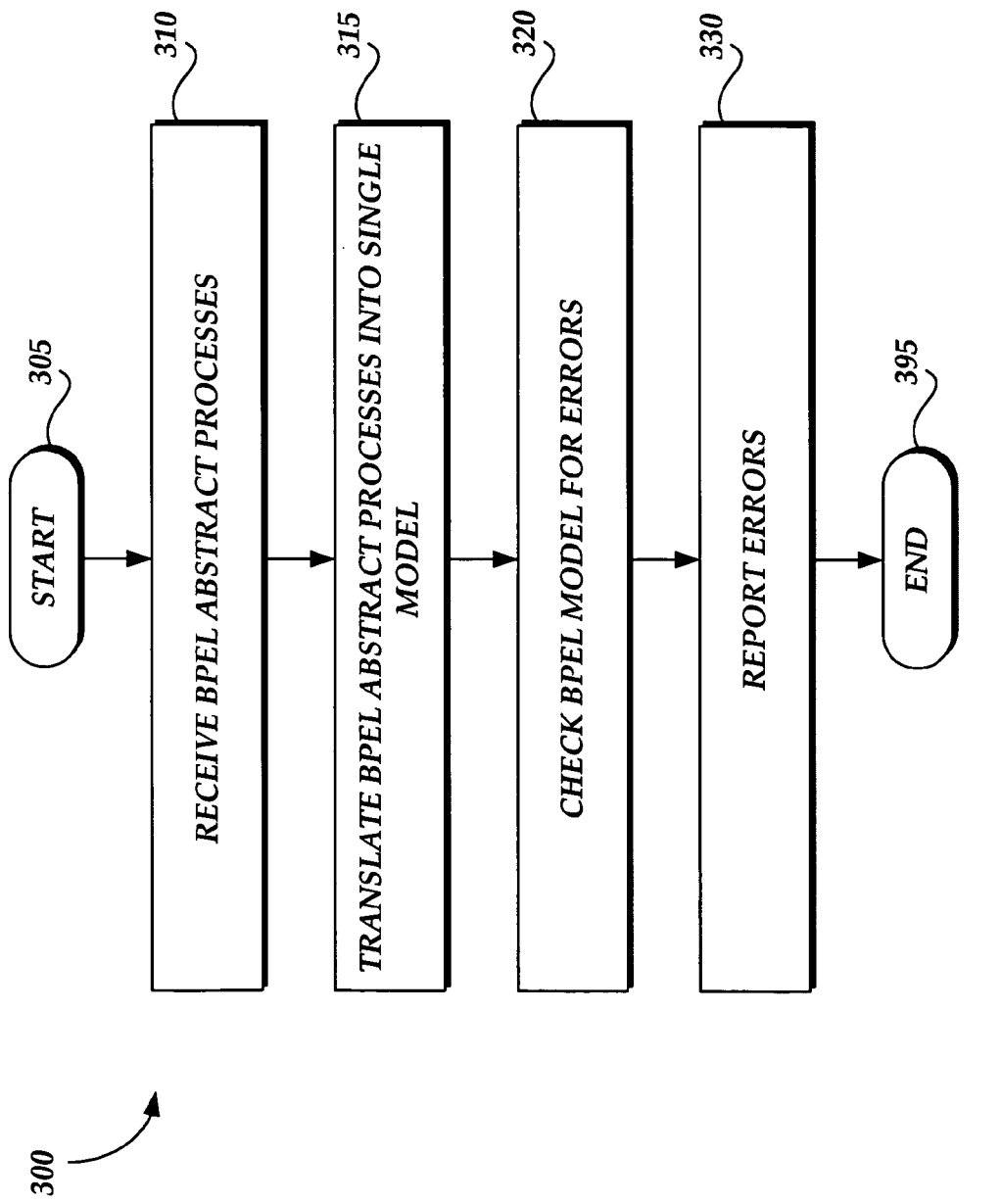
FIG. 3 is a flow diagram showing an illustrative routine for detecting communications errors between components of disparate web services computing systems according to embodiments of the present invention.

FIG. 3 is a flow diagram showing an illustrative routine for detecting communications errors between components of disparate web services systems. For purposes of example only, the example operation of a buying computer system, a selling computer system and a shipping computer system, described above, is used below for describing the flow of steps illustrated in FIG. 3. As should be understood by those skilled in the art, embodiments of the present invention are applicable to any web services system comprised of two or more computing systems that communicate with each other, as described herein. Consider then, for example, that a first computing system 200 operated by a buying company communicates with a second computing system 205 operated by a selling company. Both the first and second computing systems communicate with a third computing system 210 operated by a shipping company. Consider that the computing system 200 communicates with the computing system 205 to send messages regarding purchasing goods sold by a selling company operating the second computing system 205, and consider that the third computing system 210 communicates with both the other computing systems for passing shipping information such as shipping dates and shipping costs to and from the other two computing systems. Also consider that each of the three computing systems 200, 205, 210 include BPEL-based executable processes for describing the communications processes utilized by each of the three computing systems for communicating with other computing systems in the web services system comprised of the three computing systems.

The routine 300 begins at start block 305 and proceeds to block 310. At block 310, BPEL-based abstract processes 215, 220, 230 are automatically generated from each of the respective BPEL-based executable processes for the three computing systems comprising the example web services system. The BPEL-based abstract processes are forwarded to the model translator application 250, as described above with reference to FIG. 2. At block 315, the three BPEL-based abstract processes are translated by the model translator 250 into a single process model 255 according to a suitable modeling language. At block 320, the single process model 255 is passed through a model checking application 260. At block 320, the model checking application 260 runs a plurality of possible communications scenarios, including communications transport failure scenarios, to detect errors that will occur when the three computing systems 200, 205, 210 communicate with each other as a web services system according to the BPEL-based executable processes utilized by each computing system for communicating with other computing systems in the web services system.

At block 330, an error report 265 is generated by the model checking application 260 to identify the communications scenarios in which communications failures occur. For example, as described above, if the abstract process 220 for the computing system 205 (operated by the example selling company) specifies that it will accept order cancellation messages and price quote acceptance messages, but that it will only accept the order cancellation messages after receipt of price quote acceptance messages, then the model checking application 260 may run a modeling scenario where the two example messages are received in the reverse order to determine whether such "out of order" message receipt sequencing causes a communications failure between the first computing system 200 and the second communications system 205. If a failure occurs, then the failure and the associated facts related to the failure are entered into the error report 265. In response, developers of the executable processes for the computing system 200 and/or the computing system 205 may make changes to the individual BPEL-based executable processes for preventing the realized failure during actual operation between the two computing systems.

As described herein, methods and systems are provided for error detection in communications processes conducted between computing systems of a web services system. It will be apparent to those skilled in the art that various modifications or variations may be made in the present invention without departing from the scope or spirit of the invention. Other embodiments of the invention will be apparent to those skilled in the art from consideration of the specification and practice of the invention described herein.

We claim:

1. A method for detecting communications errors between a plurality of communicating computing systems in a web services system, comprising:
   receiving a first BPEL abstract process for communications to and from a first computing system, wherein the first BPEL abstract process is generated using one or more opaque assignments;
   receiving a second BPEL abstract process for communications to and from a second computing system, wherein the second BPEL abstract process is generated using one or more opaque assignments;
   automatically generating a single process model by combining each of the first and second BPEL abstract processes; and
   checking the single process model for communications errors occurring during one or more communications between the first and second computing systems, wherein checking the single process model for communications errors comprises determining the conformance of each of the first and second BPEL abstract processes with their associated BPEL-executable processes and wherein a communications error determined to be caused by a lack of conformance indicates that changes to an associated BPEL-executable process are not necessary.

2. The method of claim 1, whereby generating a single process model by combining each of the first and second BPEL abstract processes includes translating the first and second BPEL abstract processes into a single process model according to a modeling language.

3. The method of claim 2, whereby checking the single process model for communications errors occurring during one or more communications between the first and second computing systems further comprises passing the translated single process model to a model checking application.

4. The method of claim 3, further comprising generating an error report containing any determined communications errors that occur during communications between the first and second computing systems.

5. The method of claim 4, wherein the any determined communications errors include a deadlock error whereby the first computing system erroneously holds processing pending a message form the second computing system.

6. The method of claim 4, wherein the any determined communications errors include a message timing error whereby the first computing system fails to process a message from the second computing system where the message from the second computing system is received by the first computing system at an unexpected time.

7. The method of claim 4, wherein the any determined communications errors include a message ordering error whereby the first computing system fails to process a message from the second computing system where the message from the second computing system is received by the first computing system in an unexpected message receipt order relative to other messages received by the first computing system from the second computing system.

8. The method of claim 4, wherein the any determined communications errors include a time out error whereby the first computing system fails to process a message from the second computing system where the message from the second computing system is received by the first computing system outside a specified time for receiving the message by the first computing system from the second computing system.

9. The method of claim 4, wherein the any determined communications errors include a message transport error whereby the first computing system fails to process a message from the second computing system where the message from the second computing system is not received by the first computing system due to a message transport failure between the first computing system and the second computing system.

10. In a web services system having two or more communicating computing systems, a method for detecting communications errors between the two or more communicating computing systems, comprising:
   receiving a BPEL abstract process description of potential communications between a first computing system and a second computing system, wherein the BPEL abstract process is generated using one or more opaque assignments;
   translating the BPEL abstract process description into a process model according to a modeling language; and
   checking the BPEL abstract process description for communications errors occurring during one or more communications between the first computing system and the second computing system, wherein checking the BPEL abstract process description comprises analyzing the translated BPEL process model with the model checking application for the communications errors, wherein analyzing the translated BPEL process model comprises determining the conformance of the BPEL abstract process description with an associated BPEL-executable process and wherein a communications error determined to be caused by a lack of conformance indicates that changes to the associated BPEL-executable process are not necessary.

11. The method of claim 10, further comprising generating an error report containing any communications errors found during one or more communications between the first computing system and the second computing system.

12. In a web services system having two or more communicating computing systems, a system for detecting communications errors between the two or more communicating computing systems, comprising:
   a BPEL abstract process description operative to describe communications between a first computing system and a second computing system, wherein the BPEL abstract process is generated using one or more opaque assignments; and
   a model checking application operative to check the BPEL abstract process description for communications errors occurring during one or more communications between the first computing system and the second computing system, wherein checking the BPEL abstract process description for communications errors comprises determining the conformance of the BPEL abstract process description with an associated BPEL-executable process and wherein a communications error determined to be caused by a lack of conformance indicates that changes to the associated BPEL-executable process are not necessary.

13. The system of claim 12, further comprising,
   a model translator module operative to translate the BPEL abstract process description into a process model according to a modeling language.

14. The system of claim 13, whereby
   the model checking application is further operative to receive the translated BPEL process model; and
   the model checking application is further operative to analyze the translated BPEL process model for the communications errors.

15. The method of claim 14, whereby the model checking application is further operative to generate an error report containing any communications errors found during one or more communications between the first computing system and the second computing system.

16. A computer-readable storage medium containing computer-executable instructions which when executed by a computer perform a method for detecting communications errors between a plurality of communicating computing systems in a web services system, comprising:
   receiving a first BPEL abstract process for communications to and from a first computing system, wherein the first BPEL abstract process is generated using one or more opaque assignments;
   receiving a second BPEL abstract process for communications to and from a second computing system, wherein the second BPEL abstract process is generated using one or more opaque assignments;
   automatically generating a single process model by combining each of the first and second BPEL abstract processes, wherein generating a single process model by combining each of the first and second BPEL abstract processes includes translating the first and second BPEL abstract processes into a single process model according to a modeling language;
   checking the single process model for communications errors occurring during one or more communications between the first and second computing systems, wherein checking the single process model for communications errors occurring during one or more communications between the first and second computing systems further comprises passing the translated single process model to a model checking application and determining the conformance of each of the first and second BPEL abstract processes with their associated BPEL-executable processes, and wherein a communications error determined to be caused by a lack of conformance indicates that changes to an associated BPEL-executable process are not necessary; and
   generating an error report containing any determined communications errors that occur during communications between the first and second computing systems in order to identify communications scenarios in which communications failures occur, wherein a communications scenario comprises determining whether a plurality of messages received in reverse order causes a communications failure between the first and second computing systems.

* * * * *